(12) United States Patent
Shivaiah

(10) Patent No.: US 11,517,152 B1
(45) Date of Patent: Dec. 6, 2022

(54) AUTOMATIC COMPACT FOOD PREPARATION APPARATUS WITH CUSTOMIZABLE RECIPES

(71) Applicant: Vinay Shivaiah, Alpharetta, GA (US)

(72) Inventor: Vinay Shivaiah, Alpharetta, GA (US)

(*) Notice: Subject to any disclaimer, the term of this patent is extended or adjusted under 35 U.S.C. 154(b) by 441 days.

(21) Appl. No.: 16/881,012

(22) Filed: May 22, 2020

(51) Int. Cl.
*A47J 44/00* (2006.01)
*A47J 43/07* (2006.01)
*A47J 43/044* (2006.01)
*A23L 5/10* (2016.01)
*A47J 36/34* (2006.01)
*A23L 5/00* (2016.01)

(52) U.S. Cl.
CPC .......... *A47J 44/00* (2013.01); *A23L 5/00* (2016.08); *A23L 5/11* (2016.08); *A47J 36/34* (2013.01); *A47J 43/044* (2013.01); *A47J 43/0727* (2013.01)

(58) Field of Classification Search
CPC ...... A23L 5/00; A23L 5/11; A23L 5/12; A47J 44/00; A47J 36/34; A47J 43/0727; A47J 43/044
See application file for complete search history.

(56) References Cited

U.S. PATENT DOCUMENTS

| | | | | |
|---|---|---|---|---|
| 4,919,950 A * | 4/1990 | Mak | ......... | G07F 11/70 426/523 |
| 5,088,390 A * | 2/1992 | Wong | ......... | A47J 43/04 99/335 |
| 6,843,166 B1 * | 1/2005 | Li | ......... | A47J 27/14 99/332 |
| 8,276,505 B2 * | 10/2012 | Buehler | ......... | A47J 44/00 99/348 |
| 2014/0230660 A1 * | 8/2014 | He | ......... | A47J 27/14 99/325 |
| 2018/0279835 A1 * | 10/2018 | He | ......... | A47J 36/06 |
| 2019/0038071 A1 * | 2/2019 | He | ......... | A47J 44/00 |
| 2020/0323382 A1 * | 10/2020 | He | ......... | A47J 36/32 |
| 2020/0367687 A1 * | 11/2020 | Wang | ......... | A47J 36/32 |
| 2022/0031122 A1 * | 2/2022 | He | ......... | A47J 36/34 |
| 2022/0257060 A1 * | 8/2022 | Kodali | ......... | B25J 15/0433 |

FOREIGN PATENT DOCUMENTS

CN 113208441 A * 8/2021
WO WO-2021172983 A1 * 9/2021

* cited by examiner

*Primary Examiner* — Christopher R Harmon

(57) ABSTRACT

The invention provides an automatic and compact food preparation apparatus that prepares a food automatically. The food preparation apparatus of present invention is comprising of an electronic control unit that stores the recipes and accordingly controls the working of all the other units of the food preparation apparatus according to the recipe steps. The food preparation apparatus further includes a wok pan unit, a stirring unit, a raw ingredient dispensing—slot assembly unit and a spice or liquid dispensing unit that by working according to the recipe steps, cooks or prepares the food recipe. The food preparation apparatus further includes a user interface to allow user to select the recipe to prepare, to modify the recipe according to the user requirement and to communicate with the food preparation apparatus.

13 Claims, 15 Drawing Sheets

AUTOMATIC COMPACT FOOD PREPARATION APPARATUS WITH CUSTOMIZABLE RECIPES

FIELD OF THE INVENTION

The present invention relates to an automatic compact marketable food preparation apparatus. More particularly, it relates to a compact food preparation robot that automatically cooks/prepares food according to the customizable recipes stored within the food preparation apparatus.

BACKGROUND OF THE INVENTION

A basic requirement for the survival of every living being is food and nutrition. Cooking and food preparation, hence, is a survival skill. But in this day and age where men and women are working day and night, keeping up with a fast-paced lifestyle, cooking has become a luxury only those with time can indulge in. Hence, the growth of the fast food industry and a decline in nutrition levels and health. It is the need of the hour that nutritious home-based cooking be made easy and effortless. To facilitate this need, there has been a growth spurt in the use of technology in the kitchen— be it in the form of simple multiple-purpose instant pots to the use of robots in the high-end restaurants.

These existing robots catering to the culinary needs are however very huge and have industry-grade applications and are not feasible to be used within the household. For example, the invention of "Automatic cooking machine" disclosed in a U.S. Pat. No. 6,112,645 which includes a feeding device, a cooker transmission device, a serving device, a washing device, a stir-fry device and a panel each mounted on a base. In an invention like such, the presence of robotic arms, a multitude of compartments, not-to mention the humongous size renders such inventions inaccessible to the public. Also, most of these inventions do not allow preparation of a customized meal and rather depend on a set of pre-loaded instructions and cooking methodologies.

Therefore, there exists a need of an automatic food preparation system or apparatus that is compact in size to make the apparatus commercially suitable and easily marketable. There is further need of an automatic food preparation apparatus that may use electric energy instead of gas or fuel for cooking or stir frying. Also, there exists a need of an apparatus wherein the wok pan may move longitudinally to collect all the ingredients.

Another reason for this compact automatic food preparation is that during the COVID-19 crisis most restaurants were closed and people were locked down in their homes. As outside food was not available, people were forced to cook 3 meals a day in their home, every day for at least 2-3 months. With this compact food preparation apparatus, people are not tempted to go out for food and hence effectively following the shelter in homes law as they are getting the restaurant style food at the comfort of their homes.

SUMMARY

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The disclosure of present invention provides an automatic food preparation apparatus that is comprising of a smart electronic control unit; a wok pan with a stirring unit; a raw ingredient dispensing unit having a plurality of slots; and a spice/liquid dispensing unit to automatically prepare the recipes stored within the electronic control unit.

According to one embodiment, the electronic control unit is further comprising of a computer controller and a storage unit to store the food recipes, to execute the recipe steps and accordingly manipulate or control operation of all the other units of the food processing apparatus. The electronic control unit is further comprising of a user interface to allow user to select the recipes, modify or make changes in recipes or to communicate with the food processing apparatus. The wok pan with plurality of sensors is configured for cooking the recipes with precise dispensation of spices and monitoring of salt content, sour content as well as temperature of the wok pan.

The stirrer unit with improved design of curved zigzag stirrer is provided for better stirring. The stirring unit further includes a tilting mechanism that automatically tilts down the stirrer within the wok pan during cooking and tilts back upward after cooking. The wok pan and the stirrer unit is configured over a platform mounted within the rail from two sides that allows movement of the platform along with the wok unit, so that the wok pan can collect the ingredients from the dispensing units.

The raw ingredient dispensing unit—slot assembly is provided with a plurality of slots that by rotating, dispenses the raw ingredients into the wok pan unit. The slots of the slot assembly are coupled with the motors that rotate the slots to dispense the ingredients. According to one embodiment, the spice/liquid dispensing unit is provided to dispense the spices and liquid ingredients into the wok pan according to the recipe steps. A wireless communication module is also configured that allows remote monitoring and control of the food preparation apparatus using any smart user device of the user such as smartphone from any remote location.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings.

However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF INVENTION

Figure 1:
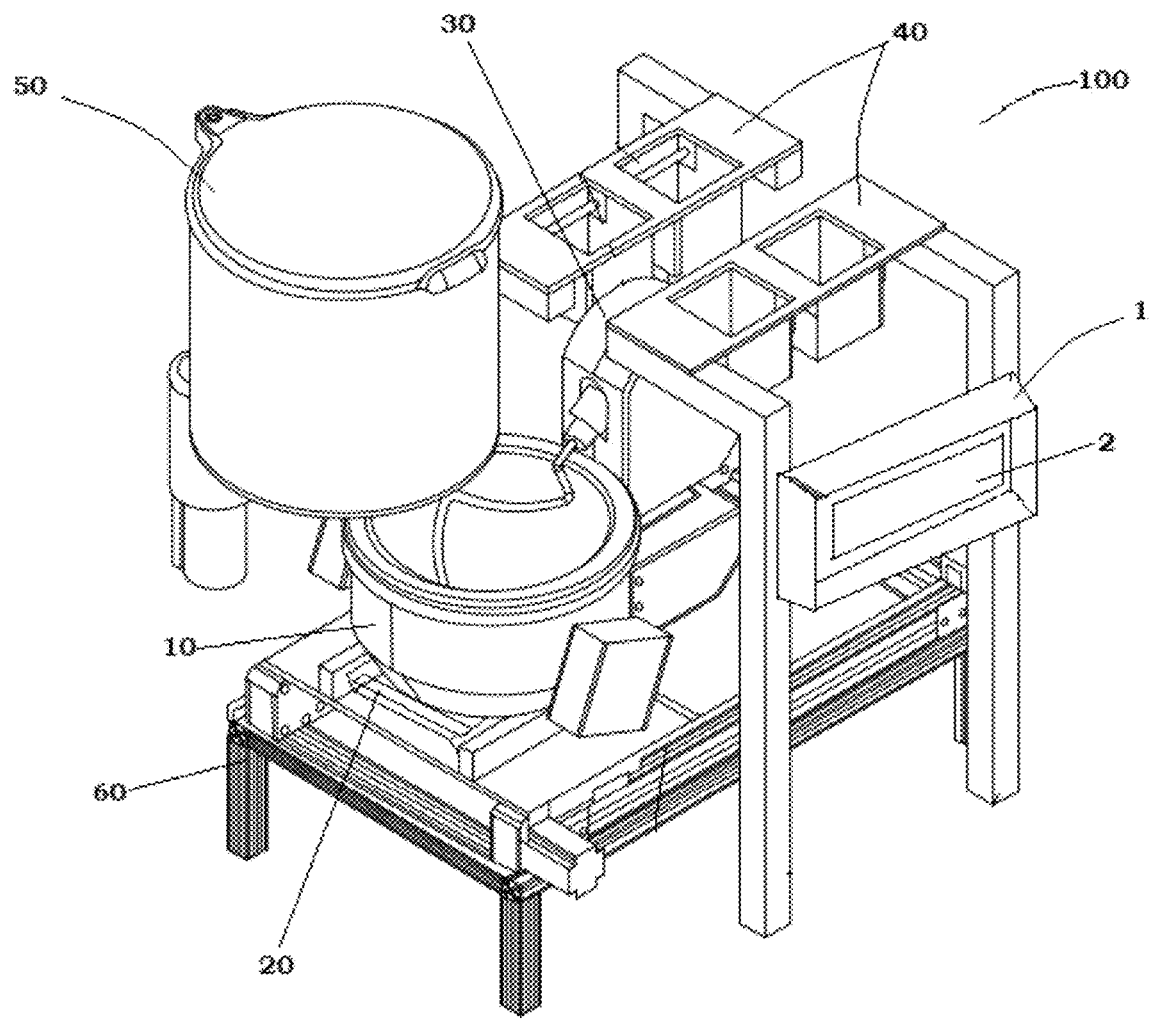
FIG. 1 illustrates functional diagram of an entire food preparation apparatus according to one exemplary embodiment of invention.

The embodiment herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the method and embodiments herein may be practiced and to further enable those of skill in the art to practice the embodiments herein. Accordingly, the examples should not be construed as limiting the scope of the embodiments herein.

The embodiment of present invention provides an automatic and compact food preparation apparatus that prepares food automatically without any need of human intervention. Particularly, the present food preparation apparatus comprises a wok pan as a cooking utensil to cook the recipe stored within a control unit of an apparatus. According to one embodiment, the food preparation apparatus of present invention is mainly comprising of a control unit having a smart controller to store the recipes, execute the steps or instruction of recipe and accordingly manipulate operation of all the other units of the food preparation apparatus according to the recipe steps to prepare the recipe and a user interface coupled with the control unit to allow user or individual to select the recipe, change or modify the recipe, add new recipe, delete recipe as well as to inform the control unit about the ingredients and respective number of slot in which the ingredient is filled so that the control unit may command to dispense that ingredient from said slot, according to the recipe steps. According to one embodiment, the control unit allows user to add the recipe and recipe steps in layman language and comprises a translation algorithm that converts that layman recipe steps into a corresponding motor/machine actions during recipe preparation. Further, the control unit of present invention includes an Artificial Intelligence (AI) mechanism that automatically learns to alter the recipe steps for next execution of the recipe after a feedback is entered into a system for any recipe.

According to one embodiment, the food preparation apparatus of present invention is further comprising of a movable wok pan unit mounted over a base unit of the food preparation apparatus that is capable of moving longitudinally along the X-axis to collect the ingredients from other ingredient dispensing units. An induction heater or cooktop is mounted beneath the wok pan unit to provide heat for cooking. According to one embodiment, the food preparation apparatus of present invention is further comprising of an improved curved zigzag designed stirrer capable of tilting, allowing the stirrer to tilt within the wok pan to stir the food ingredient during cooking and tilt out of the wok pan after cooking; a slot assembly having plurality of slots placed within the slot holders where the slots stores and dispenses raw ingredients within the wok pan; and a spice/liquid dispensing unit that stores and dispenses the spices and liquid ingredients such as oil or sauces into the wok pan according to the recipe and recipe steps.

Referring to FIG. 1 that discloses one exemplary embodiment of functional diagram of an entire food preparation apparatus 100. The apparatus 100 includes a base frame 60 for mounting and holding all the other units of the food preparation apparatus 100. According to one embodiment, the control unit 1 having an electronic controller and storage is provided to store the recipes and to manipulate or control the operation of all the other units of the food processing apparatus 100 according to the recipe steps. The control unit 1 also allows user to add the recipe and recipe steps in layman language and comprises a translation algorithm that converts that layman recipe steps into a corresponding motor/machine actions during recipe preparation. Further, the control unit 1 of present invention includes an AI mechanism that automatically learns to alter the recipe steps for next execution of the recipe after a feedback is entered into a system for any recipe. A user interface 2 coupled with the control unit 1 is provided to allows user to communicate or give instruction to the apparatus 100 or take a requests or notifications from the apparatus 100 about the ingredients and the number of slots for that ingredient etc. The wok pan 10 is configured over the platform that is configured over the base frame 60 and mounted within the rails in the middle of the platform to allow the movement of platform and hence the wok pan 10 in longitudinal direction to collect ingredients from the slot assembly 40 and the spice/liquid dispensing unit 50. An electronic powered heating unit 20 is configured over the platform below the wok pan 10 to provide heat to the wok pan 10 for cooking. The electronic powered heating unit 20 is any of heating device such as, but not limited to, an induction heater or cooktop.

According to present embodiment, the stirrer unit 30 is also coupled with the platform alongside the wok pan 10. The stirrer unit 30 is comprising of a curved zigzag shaped stirrer connected with the rotator motor to continuously rotate and stir the ingredients within the wok pan 10. The stirrer unit 30 is further comprising of a stirrer tilter and tilter motor that are configured to automatically tilt the stirrer downward into the wok pan during working of the food processing apparatus 100 and to move the stirrer upward out of the wok pan 10 after food preparation.

According to one embodiment, the slot assembly 40 is configured that is comprising of plurality of slots to hold the raw ingredients and dispense them within the wok pan 10 according to recipe steps. The slot assembly 40 is configured over the slot support member to hold the slot assembly 40 over the height of the wok pan 10 allowing the slot assembly 40 to rotate each individual slot of plurality of slots to dispense the raw ingredients into the wok pan 10, according to the recipe steps. The slot assembly 40 of present invention comprises of slot holder plates configured over the slot supports and comprises a plurality of slot holders within which the slots gets placed removably.

Figure 2:
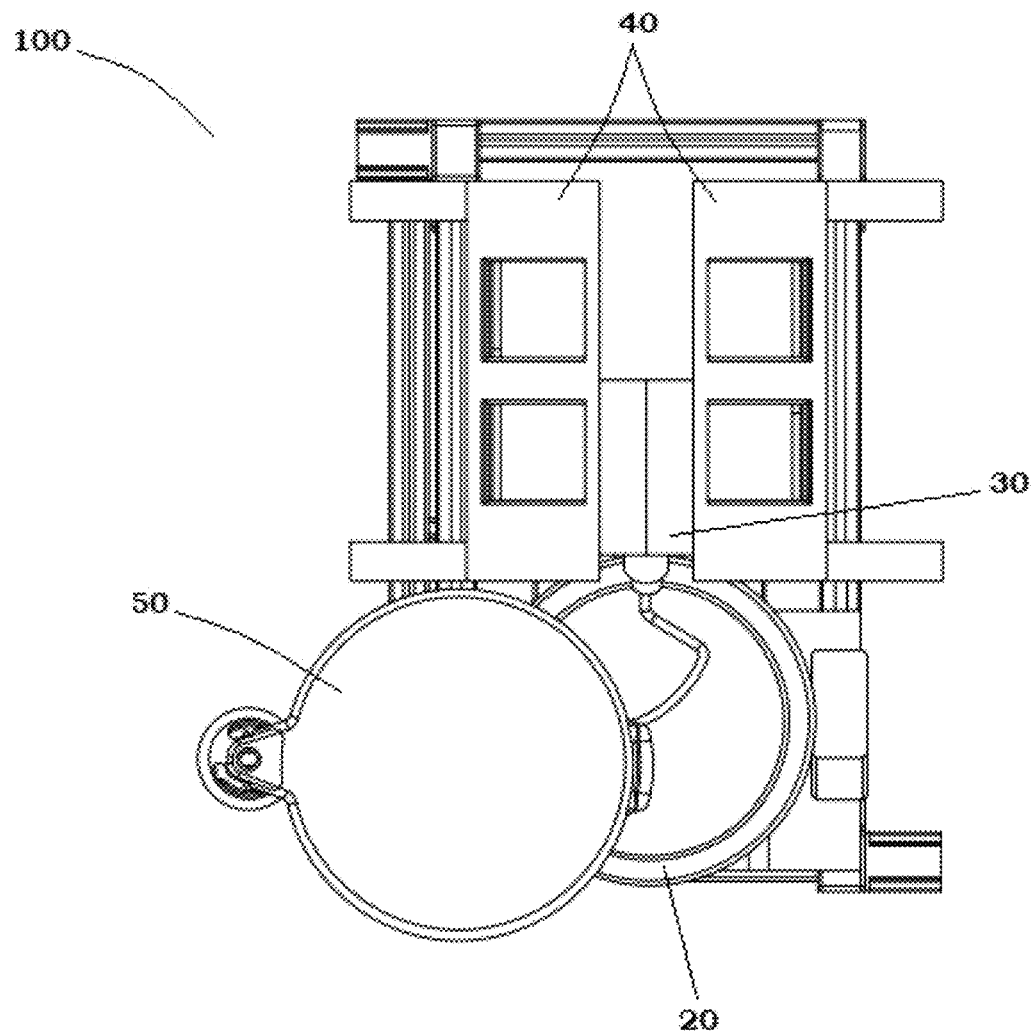
FIG. 2 illustrates top view of the same food preparation apparatus of FIG. 1.

According to one embodiment, the spice/liquid dispenser unit 50 is also configured to further comprise of plurality of tube like containers 52 mounted around the perimeter of a circular compartment of the spice/liquid dispenser unit 50. The bottom of the circular compartment of the spice/liquid dispenser unit 50 comprises a single opening or aperture aligned in a way that the dispensed ingredient from the spice/liquid dispenser unit 50 may fall within the wok pan 10. According to recipe steps, the spice/liquid dispenser unit 50 rotates the containers 52 to align the aperture with the tube containing required ingredient to dispense the required ingredient into the wok pan 10. FIG. 2 of present invention shows top view of the same food preparation apparatus of FIG. 1.

Figure 3:
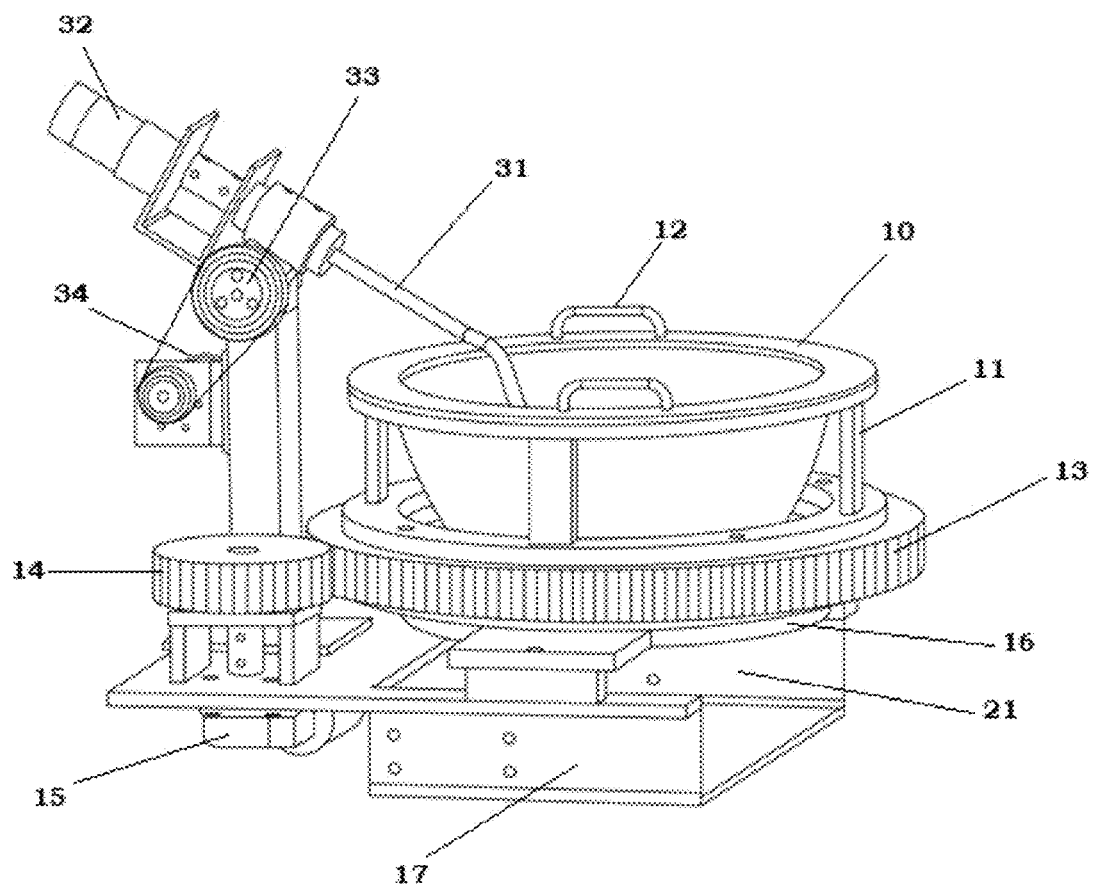
FIG. 3 shows detailed view of a wok pan and stirring units of the food preparation apparatus of present embodiment.

FIG. 3 shows detailed view of a wok pan 10 and stirring 30 units of the food preparation apparatus 100 of present embodiment. According to one embodiment, the stir frying unit includes a wok pan 10 configured over the wok pan holder 11 to hold the wok pan at its place and to avoid displacement of the wok pan due to stirring during cooking. The wok pan 10 further comprises a wok pan handles 12 to allow individual to remove the wok pan 10 to serve the cooked food. The wok pan 10 is capable of rotating around its axis during cooking for proper spread of heat during cooking. According to one embodiment, the wok pan holder 11 is configured over a teethed wok pan holder rotator 13 that is coupled with the pan rotator motor 15 via a teethed wok pan rotator gear 14. The shaft of the pan rotator motor 15 is connected with the wok pan rotator gear 14 tooth of which is coupled with the tooth of the wok pan rotator holder 13 causing the rotation of the wok pan holder 11 with the rotation of the pan rotator motor 15. The wok pan holder rotator 13 is further configured over the platform 17 through a wok pan holder ball bearing 16 that allows rotation of the wok pan holder 11 and hence the wok pan 10 over the platform 17. The wok pan unit further includes space within the platform 17, beneath the wok pan holder ball bearing 16 and holder 11 for configuration of the electronic powered heating unit 20.

According to one embodiment, the wok pan 10 is further comprising of a plurality of sensors fixed within the wok pan 10. The plurality of sensors includes, but not limited to, a load sensor to precisely detect the amount of spices being dispensed, a temperature sensor to constantly monitor the temperature of the wok pan 10, a salinity sensor configured to determine the salt content and a pH sensor to identify the sour content.

According to present embodiment, the stirring unit 30 of the food preparation apparatus is configured alongside the wok pan unit so that a stirrer 31 of the stirring unit may tilt down into the wok pan 10 to stir the food during preparation. The Stirrer 31 according to present embodiment is a curved zigzag designed stirrer that improves the functionality or the stirrer 31. The stirrer 31 is connected to the supporting pole and coupled with a stirrer rotator motor 32 that rotates the stirrer 31. According to one embodiment, the stirring unit 30 is further comprises a stirrer tilter 33 and a tilter motor 34 that are configured to tilt the stirrer within the wok pan 10 during cooking operation and tilt it upward out of the wok pan 10 after cooking so that the individual may remove the wok pan 10 for serving of cooked food and for cleaning of the wok pan 10.

Figure 4:
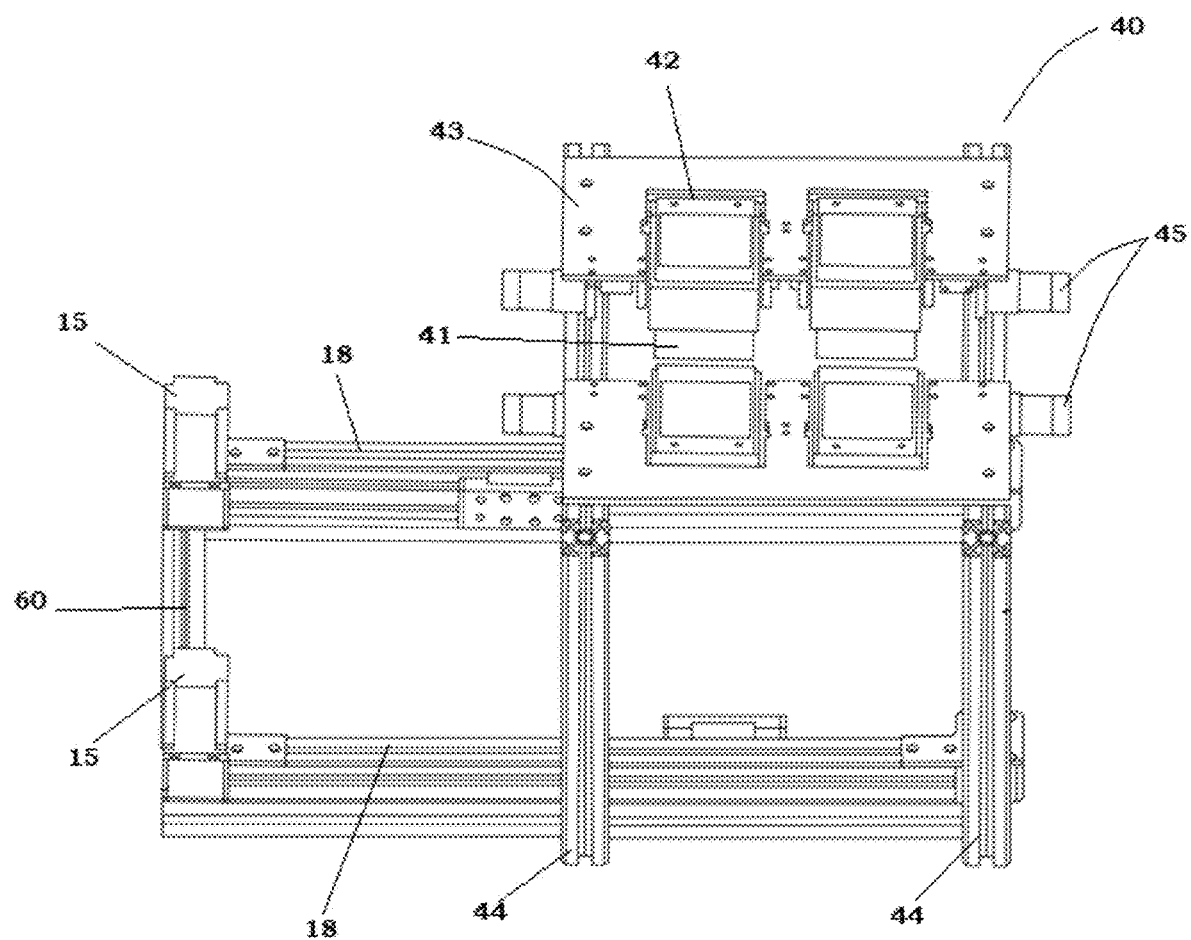
FIG. 4 illustrates slot assembly on the base unit of the food preparation apparatus.

Now, FIG. 4 shows only the slot assembly 40 configured on the base unit of the food preparation apparatus 100. The slot assembly 40 is configured over the base frame 60 through a slot support members 44. The slot support members 44 holds the slot assembly 40 at a height above the wok pan unit to allow slot assembly 40 to dispense ingredients into the wok pan by rotating slot holder 41. According to one embodiment, the slot assembly 40 is comprising of a pair of slot holder plates 43 mounted over the slot support members 44 where the slot holder plates 43 holds the plurality of slot holders 42 within which a slots 41 gets fixed removably. According to present invention, the configuration of pair of the slot holder plates 43 over the support member 44 forms a gap between the slot holder plates 43. The gap allows the slot assembly to rotate the slot holder 42 in the direction of gap and dispense the ingredient present within the slot 41 into the wok pan 10. As explained in earlier drawings, the wok pan unit is configured over the platform that is fixed within the rails 18 to allow movement of the wok pan unit. The wok pan unit moves in longitudinal direction and places itself under the gap to collect the ingredient being dispensed from the slot 41 according to recipe steps. The slot assembly 40 further comprises a plurality of electric motors 45 coupled with each of the plurality of slot holders 42 to rotate the slot holders 42 in a direction of gap to automatically dispense the ingredients into the wok pan unit present within the gap.

According to one embodiment, separate motors 45 are coupled with each of the plurality of slot holders 42 to provide rotation of each of the slot holder 42 individually. According to one embodiment, the food preparation apparatus 100 of present invention further includes a set of motors 15 fixed over two adjacent corner of base frame 60 and configured to provide power for movement of the wok pan unit and hence the wok pan 10 within the rails 18 in a direction parallel to the rails 18.

Figure 5:
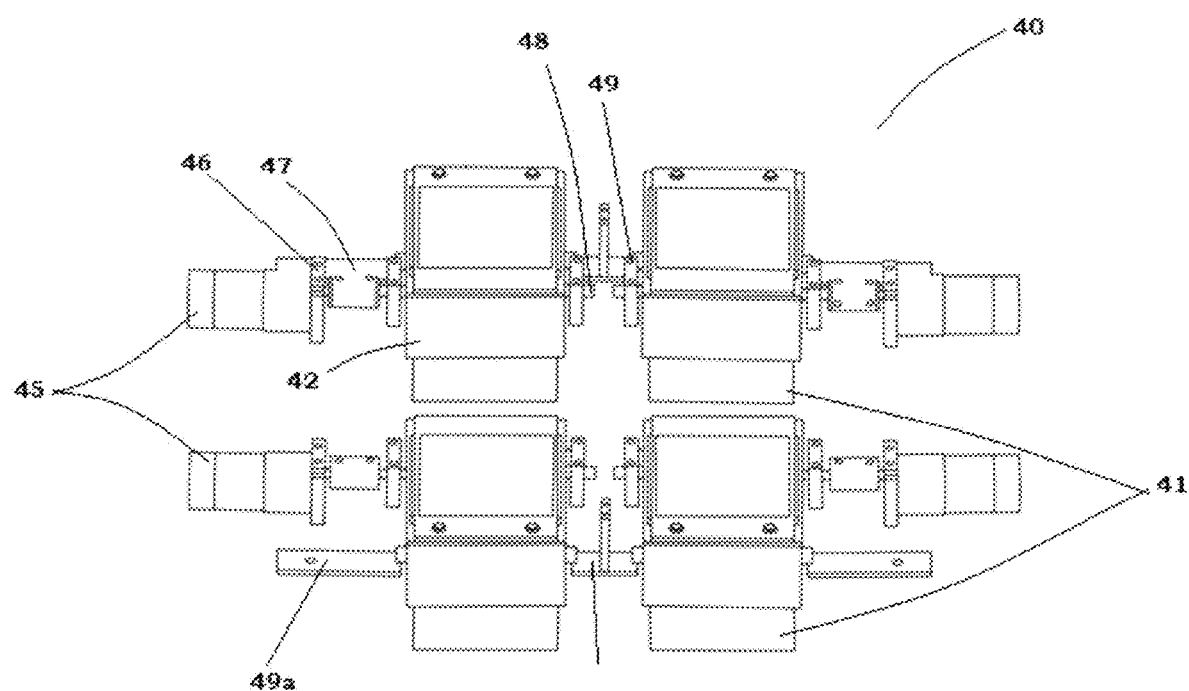
FIG. 5 shows detailed view of a slot assembly of present food preparation apparatus.

FIG. 5 shows more detailed view of a slot assembly 40 of present food preparation apparatus 100 without the slot holder plates 43 explaining complete mechanism of working of the slot assembly 40. According to present embodiment, the slot assembly is comprising of a plurality of slots 41 removably fixed within the slot holders 42. Each of the slot holders 42 are coupled with the separate motors 45 that rotates the slot holder 42 and hence the slot 41. The slot holder shaft 48 of the slot holders 42 are connected with the shaft of the motors 45 using the coupler 47. The slot assembly 40 according to present embodiment, is further comprising of a slot ball bearing supports 49 at both the ends of the slot shafts 48 of each slot holder 42 to allow rotation of separate slot holders 42 without affecting other slot holders 42, motors 45 or the complete slot assembly 40. A motor supports 46 are provided to connect with the slot holder plates 43 to provide additional stability to the motors 45 and assembly 40 during working. According to one embodiment, a slot rotation stopper 49a are also configured to prevent the rotation of slot holder 42 in a direction opposite to the gap or outwards.

Figure 6A:
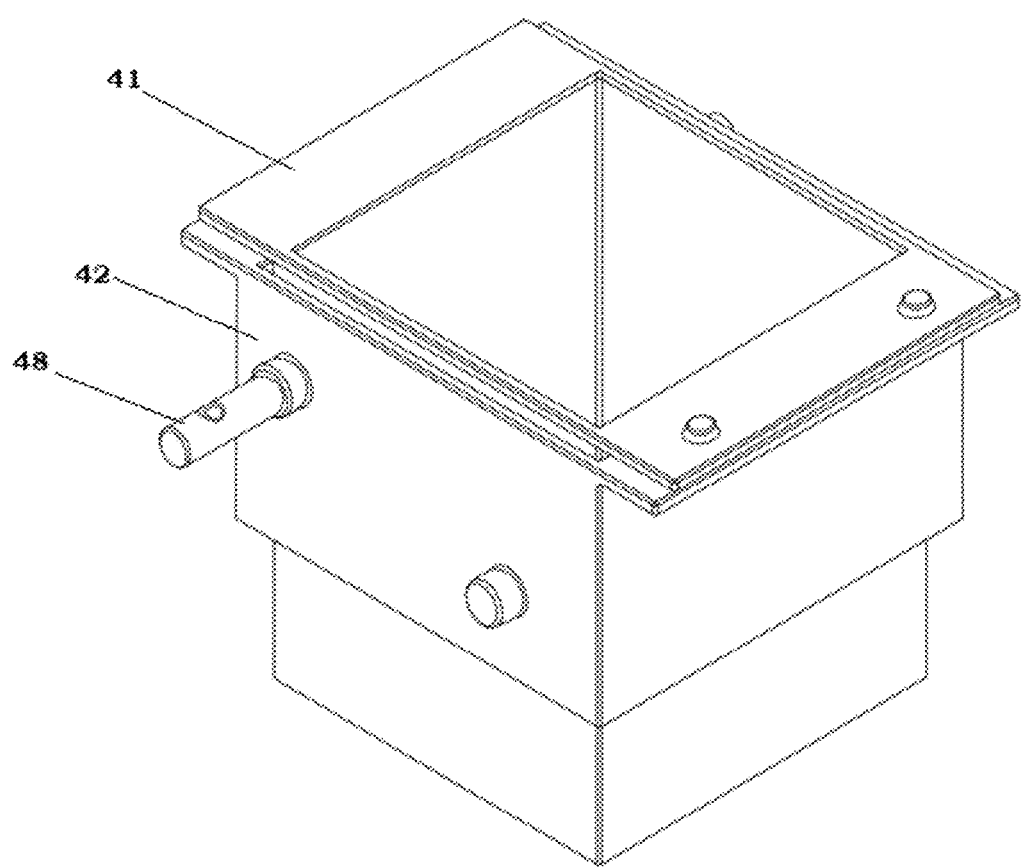
FIG. 6a shows view of a slot placed within the slot holder of slot assembly.
Figure 6B:
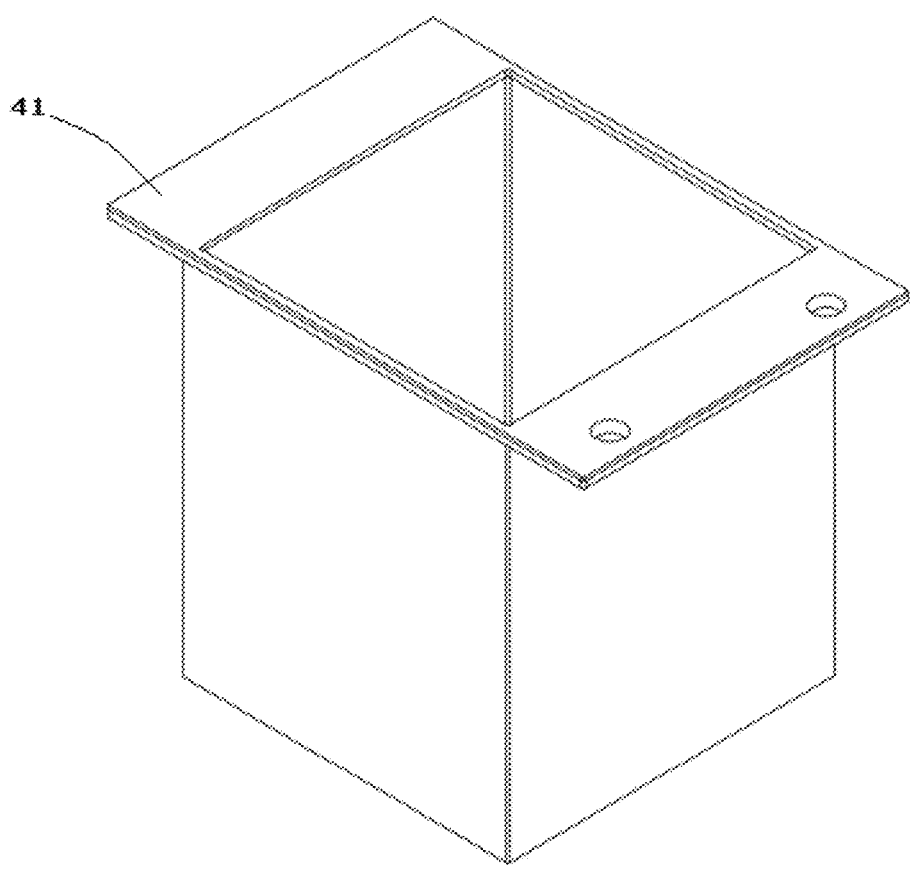
FIG. 6b shows view of a slot of the slot assembly of present food preparation apparatus.

FIG. 6a shows view of a slot 41 placed within the slot holder 42 of slot assembly 40. The slot holder 42 holds the slot 41 within it and includes a slot holder shaft 48 that connects the slot holder 42 with the motor 45 that rotates the slot holder 42 and hence the slot 41 to dispense the ingredient. While, FIG. 6b shows view of a slot 41 of the slot assembly 40 of present food preparation apparatus 100.

Figure 7A:
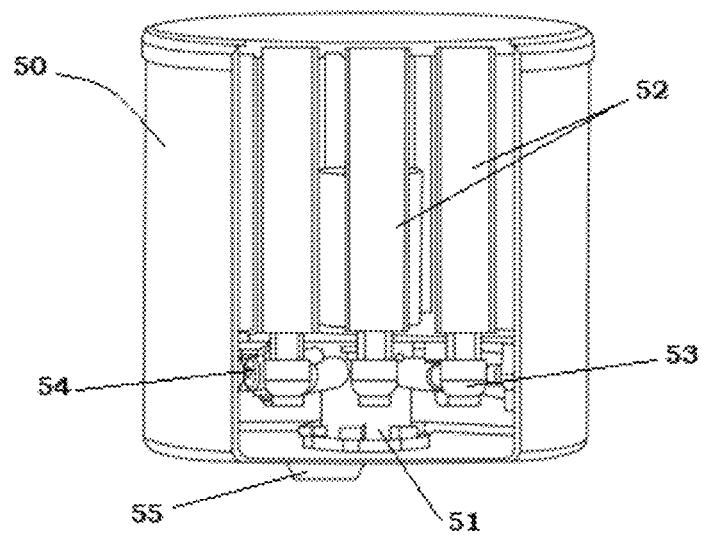
FIG. 7A shows cut-out view of the spice/liquid dispensing unit of the food preparation apparatus of present invention.

FIG. 7A illustrates the cut-out view of the spice/liquid dispensing unit 50 of the food preparation apparatus 100 of present invention. According to one embodiment, the spice/liquid dispensing unit 50 is a circular enclosure having a vertical support member 51 at the center and plurality of cylindrical slots 52 connected with the vertical support member 51 and placed around the inner periphery of the circular enclosure. The vertical support member is comprising of an electronic motor configured to rotate the central vertical support member 51, which in turn, rotates the plurality of cylindrical slots 52 connected to the vertical support member 51. A single aperture 55 at the bottom of the spice/liquid dispensing unit 50 is provided to allow dispensing of spices or liquid ingredients from the cylindrical slots 52 into the wok pan via the bottom aperture 55.

according to one embodiment, some of the plurality of cylindrical slots 52 are for holding a spices or powder ingredients while remaining are to hold the liquid ingredients. The cylindrical slot 52 having a liquid ingredients includes an assembly 54 having a solenoid valve at the bottom for dispensing the liquid ingredients while the cylindrical slots 52 having spices includes an assembly 53 having a scoop and motor to dispense the spices. According to the recipe steps, the motor of the vertical support member 51 rotates to align the bottom opening of the cylindrical slots 52 with the bottom aperture 55 of the spice/liquid dispensing unit 50 to dispense the ingredient of that cylindrical slot 52. After alignment of cylindrical slot 52 with the bottom aperture 55, the respective dispensing assemblies 53 or 54 opens to dispense the specific amount of ingredient from the cylindrical slot 52 of the spice/liquid dispensing unit 50.

Figure 7B:
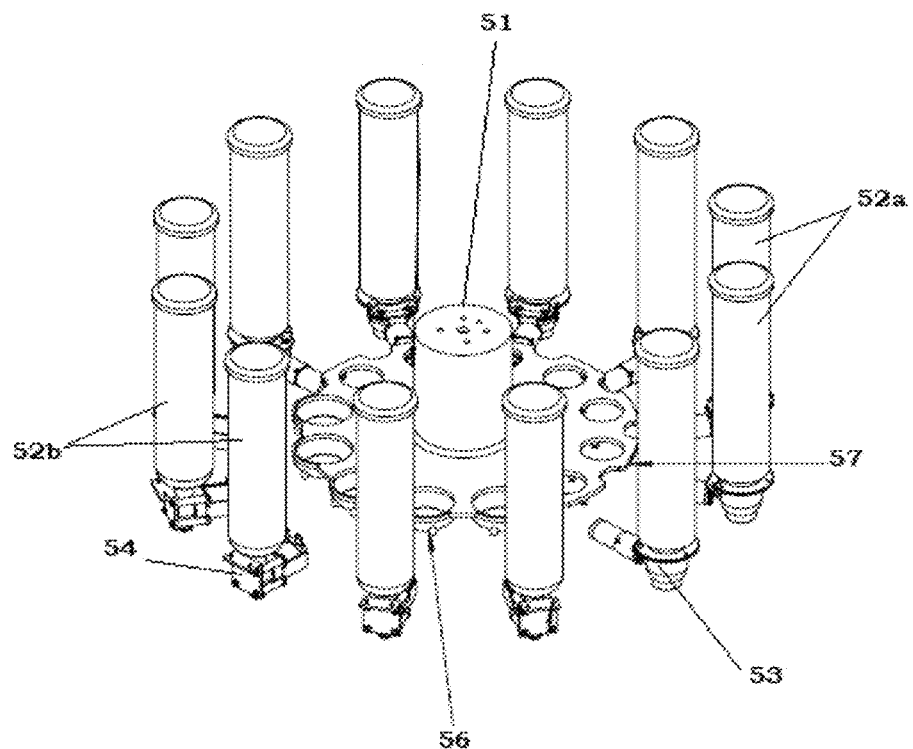
FIG. 7B shows view of the spice/liquid dispensing unit without the outer enclosure showing all the components of the unit.

Now, FIG. 7B shows more detailed view of the spice/liquid dispensing unit 50 without the outer enclosure showing all the components of the unit. According to present embodiment, the spice/liquid dispensing unit 50 includes a central vertical member or a central turret 51 that holds and rotates all of the plurality of cylindrical slots 52 out of which the slots having a powder ingredients are marked herewith as 52a and the ones having a liquid ingredients are marked as 52b. The spice/liquid dispensing unit 50 is further comprising of a liquid container groove 56 to hold the liquid ingredient holding slots 52b and a spice container groove 57 to hold the powder ingredient holding slots 52a.

Figure 7C:
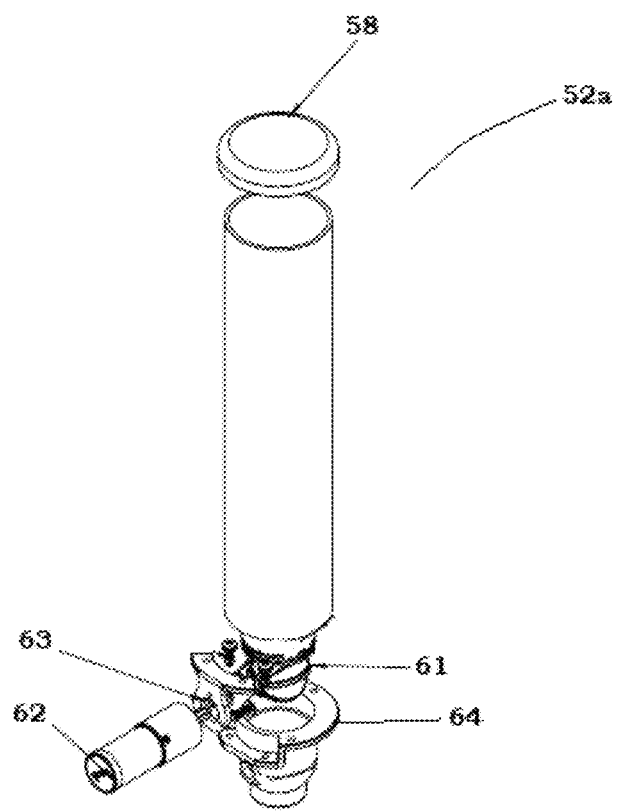
FIG. 7C shows a detailed view of a spices or powder ingredient dispensing slot of the spice/liquid dispensing unit of present invention.

FIG. 7C shows a detailed view of a spices or powder ingredient dispensing slot 52a of the spice/liquid dispensing unit 50 of present invention. According to one embodiments, the dispensing assembly 53 of the powder ingredient dispensing unit 52a includes an scoop 61 coupled with an electric motor 62 at the bottom of the dispensing unit 52a that rotates the scoop to fill the powder ingredient from the holder and dispense that ingredient. A motor holder 63 and a dispensing unit holder 64 are also configured to respectively hold the motor 62 and the whole dispensing unit 52a. A removable cap 58 is also configured at the top opening of the dispensing unit 52a to allow the user to refill the dispensing unit 52a.

Figure 7D:
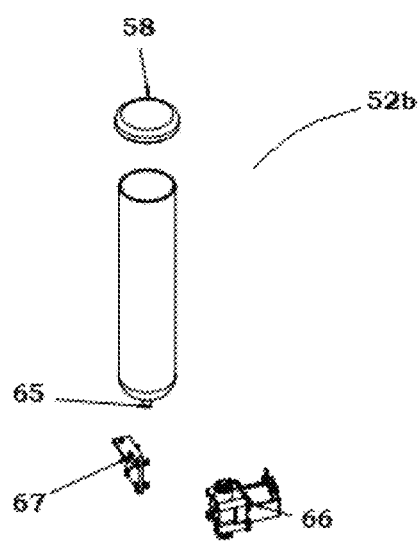
FIG. 7D shows a detailed view of a liquid ingredient dispensing slot of the spice/liquid dispensing unit of present invention.

FIG. 7D shows a detailed view of a liquid ingredient dispensing slot 52b of the spice/liquid dispensing unit 50 of present invention. The dispensing assembly 54 of the liquid ingredient dispensing slot 52b comprises a solenoid valve 66 couple at a bottom conduit 65 of the dispensing slot 52b through a solenoid holder 67 that opens or closes the bottom conduit of the dispensing slot to dispense the liquid ingredients.

Figure 8:
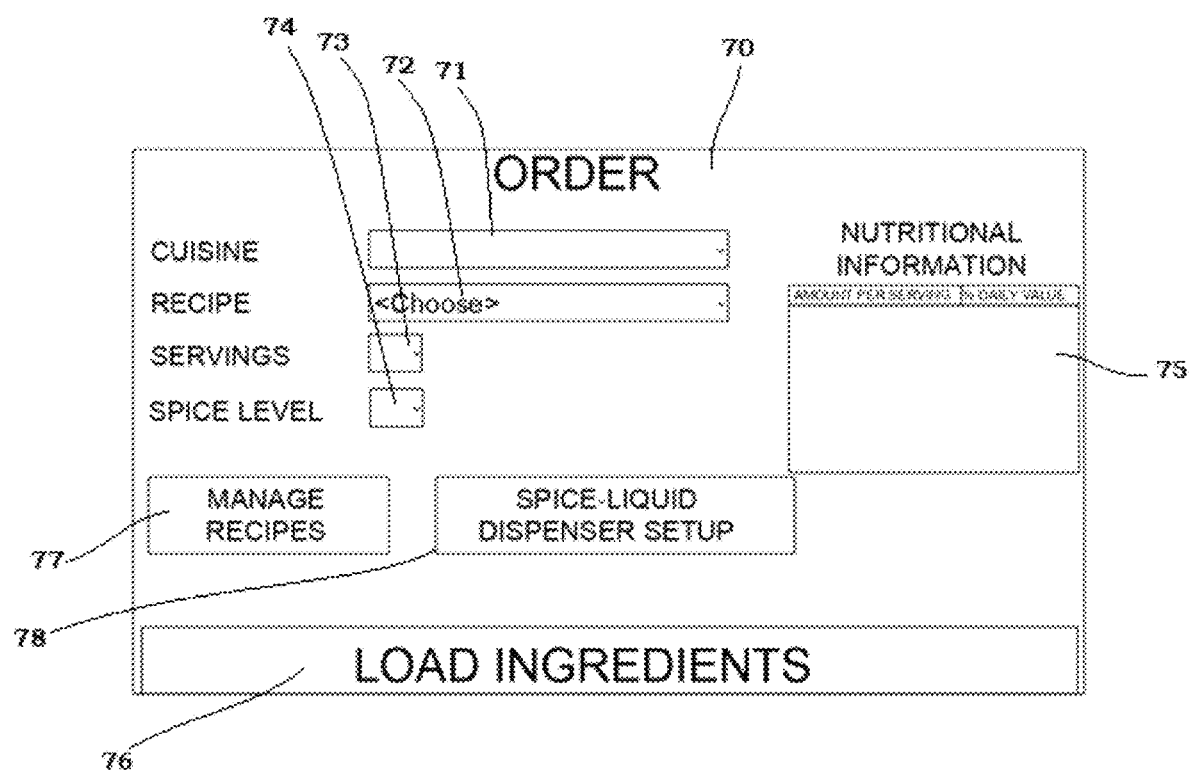
FIG. 8 shows order screen over the user interface of the food preparation apparatus.

Remaining figures discloses various screens on user interface 2 to allow a user or individual to select the recipe, to modify the recipe steps or ingredients based on personal choice, to add or manage recipes as well as to take information from the food preparation apparatus 100 of present invention about which ingredient needs to be filled in which slots of slot assembly 40 and spice/liquid dispensing unit 50. Referring to FIG. 8 now, which shows an order screen 70 of the user interface 2 of the food preparation apparatus 100 that allows user or individual to order the apparatus 100 to make the desired food recipe of the user. The order screen 70 provides drop-down menus for selection of type of cuisine 71; for selection of type of recipe 72; for selection of number of serving 73 and for selection of spice level 74. The order screen 70, at the right side shows a nutritional information 75 of the chosen recipe. According to one embodiment, the order screen 70 further includes options of manage recipe 77 that allows user to change/modify recipe or add new recipe within the control unit 1 of the food processing apparatus 100. The spice-liquid dispenser setup option 78 is provided to allow user to program or simply inform the control unit 1 of an apparatus 100 about which spice or liquid ingredient is being filled in which cylindrical slot 52 of the spice/liquid dispensing unit 50. According to one embodiment, the order screen 70 provides a 'Load Ingredient' 76 button that informs user about the ingredients which needs to be filled and also about the slot 41 of the slot assembly 40 in which it needs to be filled.

Figure 9:
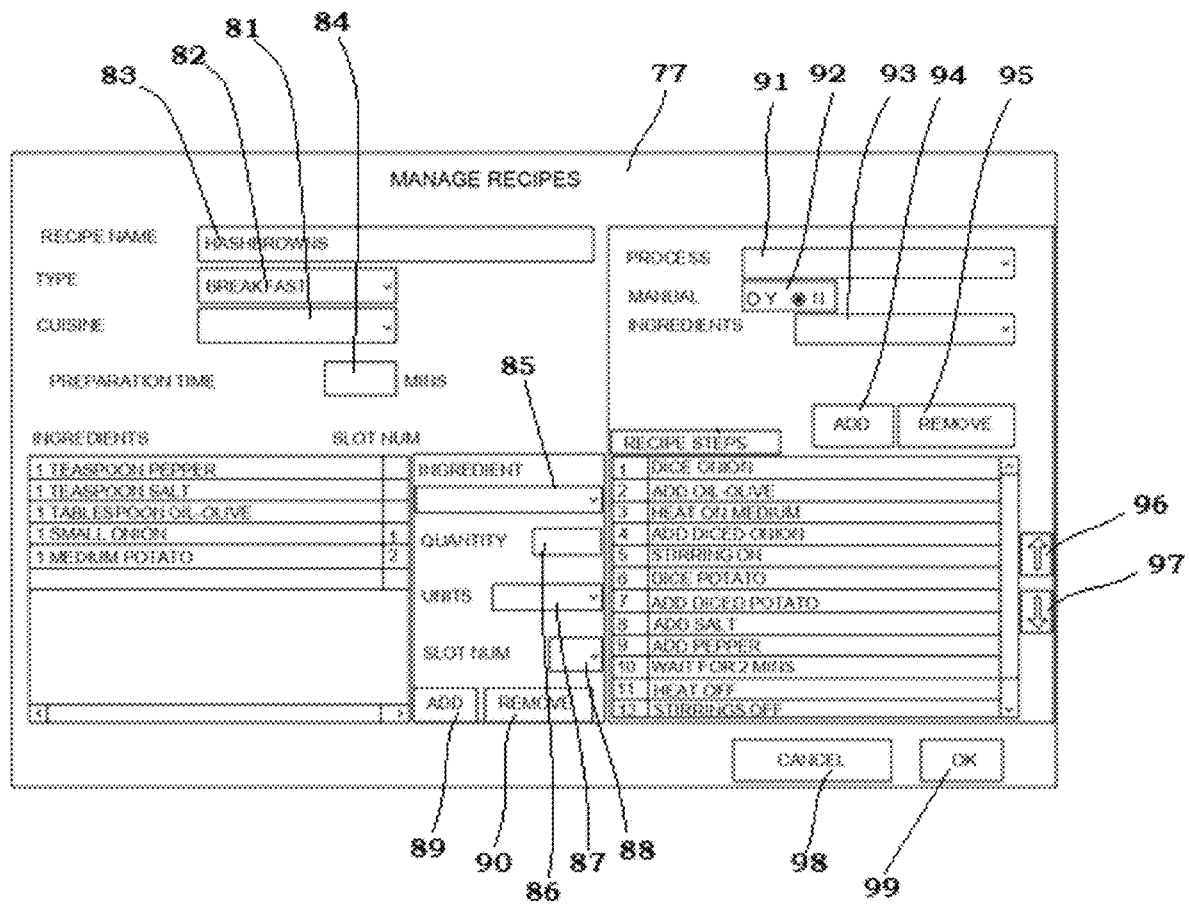
FIG. 9 shows Manage Recipe screen that allows user to add or modify recipes using the user interface of the food preparation apparatus.

FIG. 9 shows a 'Manage Recipe' screen 77 that gets open by touching the manage recipe option 77 in the 'Order' screen 70. The manage recipe screen 77 allows user to change or modify the recipe according to requirement and also add or delete the recipe from the storage of the control unit 1. The manage recipe screen 77 provides drop down menus for selection of type of cuisine 81; for selection of type of food 82 for i.e. breakfast or lunch or dinner etc.; an option to add the name of the recipe 83; an option to add the preparation time 84 for recipe in minutes. According to one embodiment, the manage recipe screen 77 further provides dropdown menus for selection of ingredients 85; quantity required 86; units 87 and slot number 88 in which the said ingredient is filled by the user. The manage recipe screen 77 discloses the list of all the selected required ingredients, their quantities and the number of slot of respective ingredients to allows control unit to take that respective ingredient from the respective slot according to the recipe steps. An 'Add' 89 and 'Remove' 90 buttons are provided to allow user to add ingredient within the list or remove ingredient from the list.

According to one embodiment, the manage recipe screen 77 further provides option for selection of process 91 such as manual or automatic 92, Ingredients 93; options to Add 94 or Remove 95. List of recipe steps as well as up 96 and down 97 buttons are provided to allow user to modify the sequence to recipe steps and after completion of all the modifications, the screen allows user to save the modification by touching button 'OK' 99 or delete the modification by touching button 'CANCEL' 98.

Figure 10:
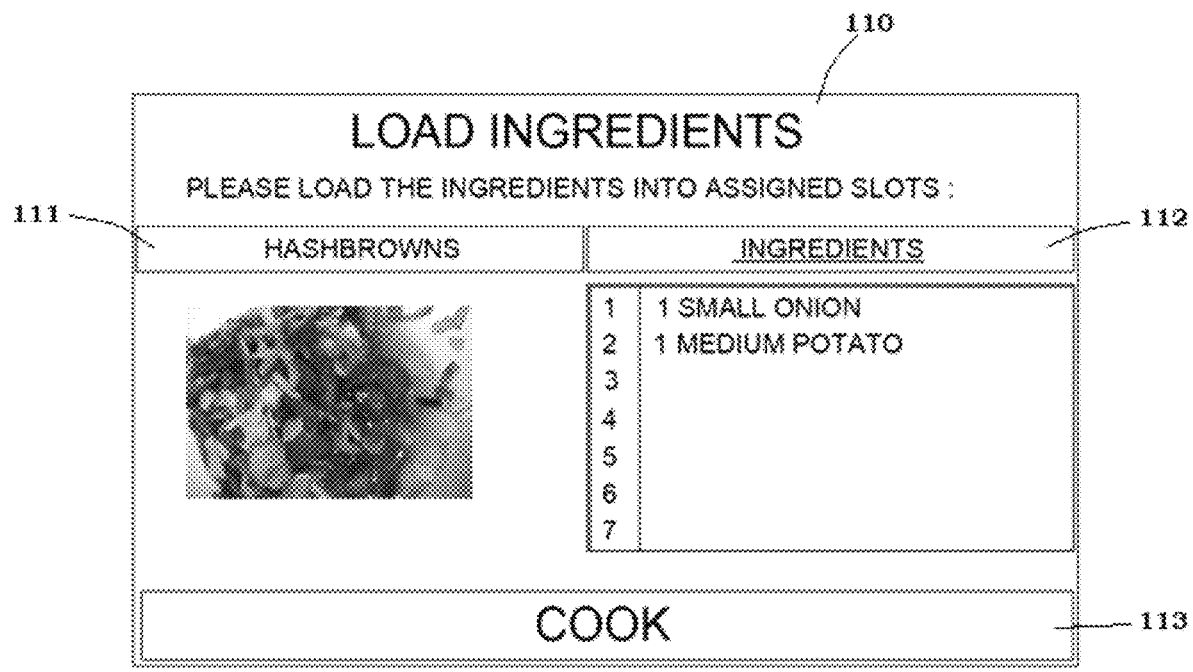
FIG. 10 shows Load Ingredients screen to instruct individual to load the respective ingredient within respective slots according to selected dish.
Figure 11:
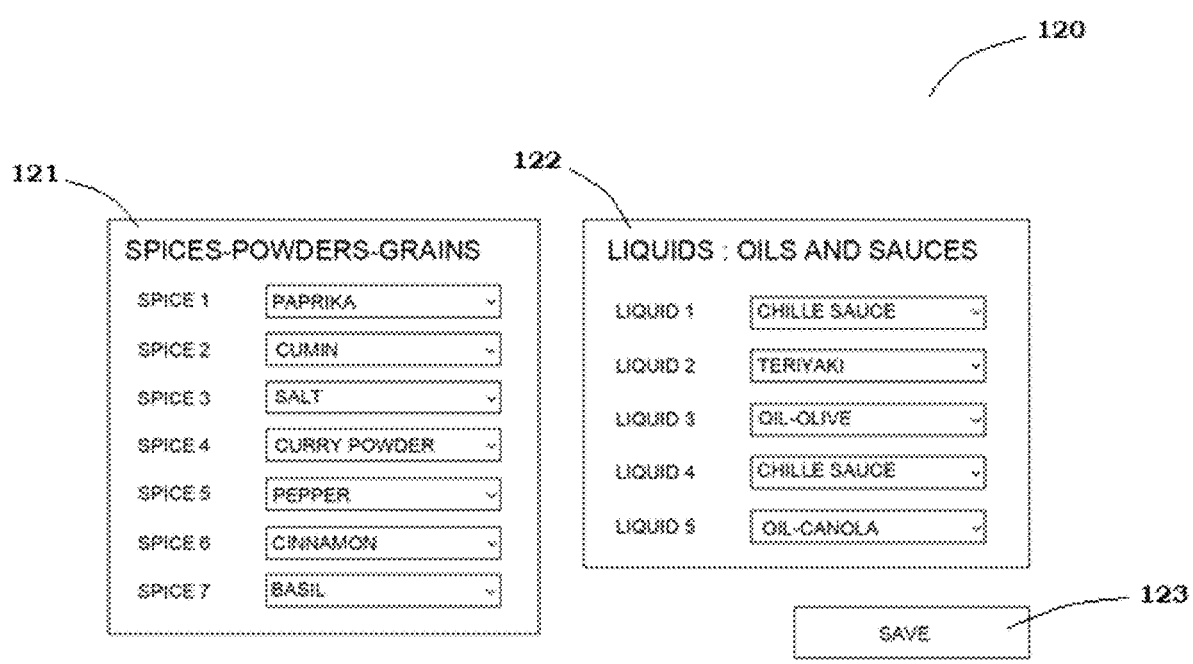
FIG. 11 shows the screen to instruct the food preparation apparatus of present invention about the spice or liquid ingredient filled within each slot of the spice/liquid dispenser.

According to one embodiment, the 'load ingredients' option 76 of the order screen 70 opens a load ingredient screen 110 shown in FIG. 10, when the user touches it. The 'Load Ingredient' screen 110 displays a name and an image 111 of a selected recipe; informs user to load the respected ingredients 112 within the respected slots of dispensing units 40 and 50 and allows user to start cooking process by touching the 'cook' button 113. While the 'Spice-liquid dispenser setup' option 78 of the order screen 70 opens a screen 120 shown in FIG. 11. This screen provides number of drop down menus equal to the number of cylindrical slots 52 of the spice or liquid dispensing unit 50. The drop down menus 121 and 122 allows user to select, mention and save the spice or liquid ingredients being filled in the respective slots of the spice or liquid dispensing unit 50.

According to one embodiment, the control unit 1 of the food preparation apparatus 100 of present invention may further include wireless communication device that may connect the control unit 1 of the food preparation apparatus 100 with the smart user device such as smartphone, tablet or any other smart device to allow user to communicate with the food preparation apparatus 100 from any location. According to one embodiment, the present food preparation system may include a mobile application configurable within the smart user device that allows user to access all the screens shown in the FIGS. 8, 9 10 and 11 within the smart user device of the user to allow control of the apparatus 100 from any remote location.

Figure 12:
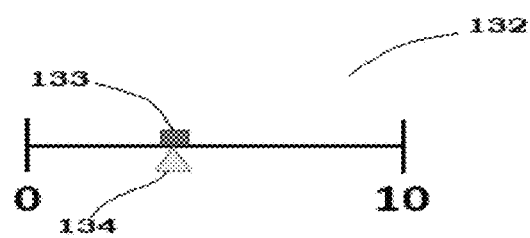
FIG. 12A shows a feedback screen that helps the AI mechanism of the present invention to automatically decide levels of ingredient and cooking in future recipes.
FIG. 12B shows a view of a slidable level indicator of the feedback screen that allows user to slide and give feedback on level of ingredients and cooking for future recipes.

FIG. 12A shows a Recipe Feedback screen 130 that helps the AI mechanism of the present invention to automatically decide levels of ingredient and cooking in future recipes. The AI mechanism of present invention, from this feedback of the user, learns to alter the recipe steps as well as the level of the ingredients and cooking while cooking the same recipe by the user in future. According to one embodiment, the Recipe Feedback screen 130 pops every time after cooking a recipe to take a feedback from the user that will be used by the AI mechanism in future.

The Feedback screen 130 includes Yes or No answerable questions 131 i.e. Salt level ok?. Further the feedback screen 130, next to this Yes or No option, includes a slidable level indicator 132 indicating level of ingredients from level 0 to 10. The slidable level indicator 132 further shows current level 133 of ingredient present within the dish and allows user to slide and set up the appropriate level 134 as a feedback to the AI mechanism for the next time. The recipe feedback screen 130 also allows user to save 135 the feedback or discard/cancel 136 the feedback. FIG. 12B shows the slidable level indicator 132 of FIG. 12A.

Figure 13:
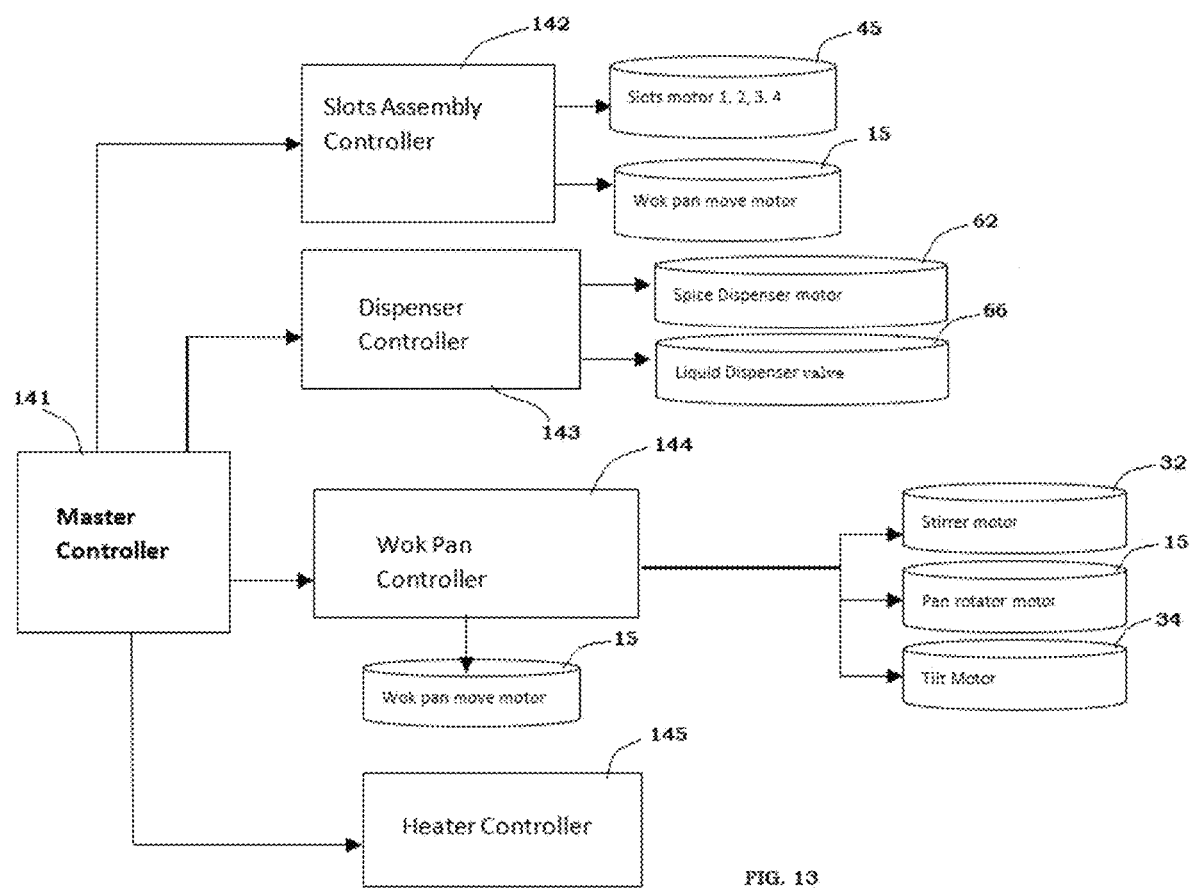
FIG. 13 shows a block diagram of working of a control unit of one exemplary embodiment of the food preparation apparatus.

FIG. 13 discloses a block diagram of a control unit of one exemplary embodiment of the food preparation apparatus. According to one exemplary embodiment, the control unit may include a master controller 141 communicatively coupled with other secondary or slave controllers of other units if the apparatus. According to one embodiment, all the other units of the apparatus includes a secondary controllers that by receiving commands from the master controller 141, manipulates operation of motors and other components of that respective unit to accomplish the task based on the recipe steps.

The apparatus of present invention includes a slot assembly controller 142, a dispenser controller 143, a wok pan controller 144 and a heat controller 145 as a secondary controller. The slot assembly controller 142, receiving control commands from the master controller 141, manipulates or actuates the slot motors 45 to dispense the ingredients of the slot 41. The slot assembly controller 142 in combination with the wok pan controller 144, manipulates working of the wok pan move motor 15 that moves the wok pan 10 within the rails 18 to collect the ingredients from the slot assembly 40. According to present embodiment, the dispenser controller 143 is configured to actuate or de-actuate the spice dispenser motor 62 and the liquid dispenser valve 66 to respectively dispense the spice and liquid ingredients with the wok pan 10.

According to present embodiment, the wok pan controller 144 further controls working of a stirrer motor 32, a tilt motor 34 and a pan rotator motor 15. A heat controller 145 is further configured that by taking data from the temperature sensor and comparing it with the required heat according to the recipe, controls the heat emission of the food preparation apparatus.

The foregoing disclosure is not intended to limit the present disclosure to the precise form or particular field of use disclosed. As such, it is contemplated that various alternate embodiments and/or modifications to the present disclosure, whether explicitly described or implied herein, are possible in light of the disclosure. Having thus described embodiments of the present disclosure, person of ordinary skill in the art will recognize that changes may be made in the form and details without departing from the scope of the present disclosure is limited only by the claims.

The invention claimed is:

1. A compact food preparation apparatus for an automatic food preparation is comprising of:
   a wok pan unit having a wok pan mounted over a movable platform via a wok pan holder to allow the wok pan to move and collect raw ingredients for cooking;
   a stirring unit placed alongside the wok pan unit wherein the stirring unit is further comprising of:
      a curved zigzag shaped stirrer connected with a stirrer motor to stir the food within the wok pan;
      a tilter assembly having a stirrer tilter and a tilter motor configured to tilt the stirrer within the wok pan during cooking and tilt upward out of the wok pan after cooking;
   a slot assembly having a plurality of slot holders to removably hold a plurality of slots that are configured to hold and dispense the raw ingredients;
   a circular spice or liquid dispensing unit configured to dispense spices or liquid ingredients into the wok pan, wherein the circular spice or liquid dispensing unit is further comprising of:
      a plurality of cylindrical tubes configured to hold the spice or liquid ingredients, where each of the plurality of cylindrical tubes are coupled with a central horizontal support member via a turret and mounted within an inner periphery of the circular spice or liquid dispensing unit;
      an aperture at a bottom of the circular spice or liquid dispensing unit configured to dispense the spice or liquid ingredient from the plurality of cylindrical tubes via the aperture;
      an electric motor coupled with the central horizontal support member to rotate the plurality of cylindrical tubes to align them with the aperture; and
      a dispensing assembly configured at a bottom opening of each of the plurality of cylindrical tubes to open and dispense the spices or the liquid ingredients from the plurality of cylindrical tubes;
   an electronic powered cooktop mounted over the movable platform beneath the wok pan to provide heat for cooking;
   a base unit configured to hold all the other units of the food processing apparatus;
   a controller unit having a computer controller with memory storage configured to store food recipes, to execute a recipe's steps and accordingly manipulate working of all the other units of the food processing apparatus to prepare the food recipe; and a user interface to allow a user to communicate with the food processing apparatus.

2. The compact food preparation apparatus of claim 1, wherein the base unit is further comprising of rails at two opposite long sides of the base unit.

3. The compact food preparation apparatus of claim 1, wherein the platform is configured within the rails to allow movement of the platform and hence the wok pan to collect the ingredients from the slot assembly.

4. The compact food preparation apparatus of claim 1, wherein the wok pan holder is coupled with a pan rotator motor through a wok pan rotator gear to further rotate the wok pan around its axis during cooking.

5. The compact food preparation apparatus of claim 1, wherein the wok pan unit is further comprising of a load sensor to detect the amount of the spices being dispensed, a salinity sensor to measure salt content, a pH sensor to determine sour content and a temperature sensor to regulate the heat.

6. The compact food preparation apparatus of claim 1, wherein each of the plurality of the slot holders is further comprising of a slot holder shaft connected with a slot rotation motors via a coupler to rotate the plurality of slot holders to dispense the raw ingredients from the plurality of slots into the wok pan.

7. The compact food preparation apparatus of claim 1, wherein the slot assembly is further comprising of a slot ball bearing and a slot ball bearing support that are configured to provide rotation of separate slot holder.

8. The compact food preparation apparatus of claim 1, wherein the slot assembly is further comprising of a slot rotation stopper to prevent rotation of the slot holder in a direction opposite to the wok pan.

9. The compact food preparation apparatus of claim 1, wherein the user interface is further configured to select the food recipe, to change or modify the recipe, to add new recipe, to delete recipe as well as to inform the control unit about the ingredients and the respective slot number from the plurality of slots in which the ingredient is filled.

10. The compact food preparation apparatus of claim 1, wherein the user interface allows the user to customize the recipes based on their taste.

11. The compact food preparation apparatus of claim 1, wherein a translation algorithm exists in the control unit that translates a layman recipe steps into a corresponding motor actions.

12. The compact food preparation apparatus of claim 1, wherein an AI mechanism exists in the control unit that learns to alter the recipe steps for next execution of the recipe after a feedback is entered into the control unit for the recipe.

13. The compact food preparation apparatus of claim 1 further includes a wireless communication module configured to allow user to monitor and control the compact food preparation apparatus from any remote location using a smart user device such as a smartphone.

* * * * *